(12) United States Patent
Mukhi et al.

(10) Patent No.: US 8,255,186 B2
(45) Date of Patent: Aug. 28, 2012

(54) PRESENTING DYNAMIC SCADA DATA

(75) Inventors: Sultan Q. Mukhi, Sugar Land, TX (US);
Jay A. Forman, Manvel, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 461 days.

(21) Appl. No.: 12/500,446

(22) Filed: Jul. 9, 2009

(65) Prior Publication Data

US 2011/0009984 A1    Jan. 13, 2011

(51) Int. Cl.
G06F 11/32 (2006.01)
G06F 17/40 (2006.01)
G06F 19/00 (2011.01)

(52) U.S. Cl. ...... 702/187; 73/865.8; 73/866.3; 340/679; 340/870.07; 340/870.16; 702/188; 715/765

(58) Field of Classification Search ................. 73/432.1, 73/865.8, 866.3; 340/500, 540, 679, 680, 340/870.01, 870.07, 870.16; 345/418, 440, 345/440.1, 440.2; 700/90, 95, 108; 702/1, 702/33, 127, 182, 187, 188, 189; 705/1.1, 705/7.11, 7.38; 715/200, 700, 764, 765
See application file for complete search history.

(56) References Cited

U.S. PATENT DOCUMENTS

| | | | | |
|---|---|---|---|---|
| 2,883,255 A * | 4/1959 | Anderson | | 346/34 |
| 3,971,000 A * | 7/1976 | Cromwell | | 700/84 |
| 4,303,973 A * | 12/1981 | Williamson et al. | | 700/84 |
| 4,792,888 A * | 12/1988 | Agarwal et al. | | 700/83 |
| 5,353,400 A * | 10/1994 | Nigawara et al. | | 715/771 |
| 5,588,109 A * | 12/1996 | Dickinson et al. | | 715/740 |
| 7,225,252 B2 * | 5/2007 | Safa et al. | | 709/224 |
| 7,305,455 B2 * | 12/2007 | Lynch et al. | | 709/218 |
| 7,730,162 B2 * | 6/2010 | Lynch et al. | | 709/218 |
| 8,073,943 B2 * | 12/2011 | Monk et al. | | 709/224 |
| 8,144,150 B2 * | 3/2012 | Gilbert et al. | | 345/440 |
| 2003/0014160 A1 | 1/2003 | Nordquist et al. | | |
| 2003/0020751 A1 * | 1/2003 | Safa et al. | | 345/760 |
| 2003/0182395 A1 * | 9/2003 | Lynch et al. | | 709/218 |
| 2005/0114500 A1 * | 5/2005 | Monk et al. | | 709/224 |
| 2007/0165031 A1 | 7/2007 | Gilbert et al. | | |
| 2008/0005277 A1 * | 1/2008 | Lynch et al. | | 709/218 |
| 2009/0172559 A1 * | 7/2009 | Waldman et al. | | 715/744 |
| 2010/0329642 A1 * | 12/2010 | Kam et al. | | 386/280 |

FOREIGN PATENT DOCUMENTS

EP        0825506        2/1998

OTHER PUBLICATIONS

PCT Search Report and Written Opinion for PCT/US2010/041458, Nov. 5, 2010.

* cited by examiner

*Primary Examiner* — Edward Cosimano

(74) *Attorney, Agent, or Firm* — Elwood L. Haynes

(57) ABSTRACT

Techniques are disclosed for presenting users with dynamic views of process data related to the operations of an industrial system. Data obtained by a SCADA system may be stored in a real-time status database (which reflects the current process data of the industrial system) and a historian database (which archives the process data from the industrial system as it changes over time). A design canvas allows users to compose a dynamic view of the process data obtained by the SCADA system. For example, a user may compose a dynamic view of selected temperatures, pressures, and flow rates obtained by the SCADA system while monitoring the status of a pipeline.

25 Claims, 8 Drawing Sheets

Different Widget for Showing SCADA data on a web browser:
Data Wiget 205
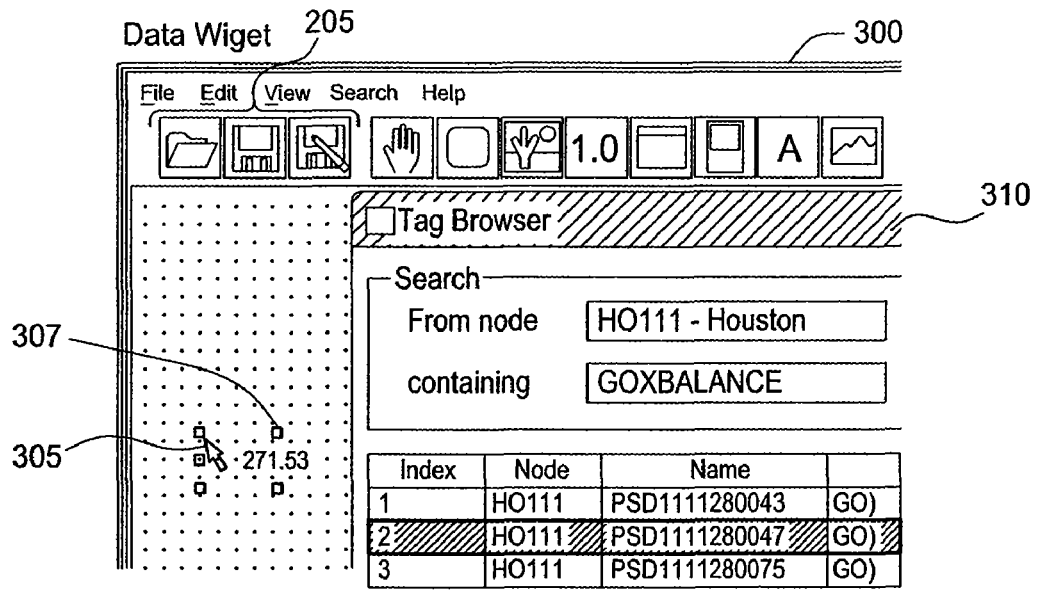
Bar Widget
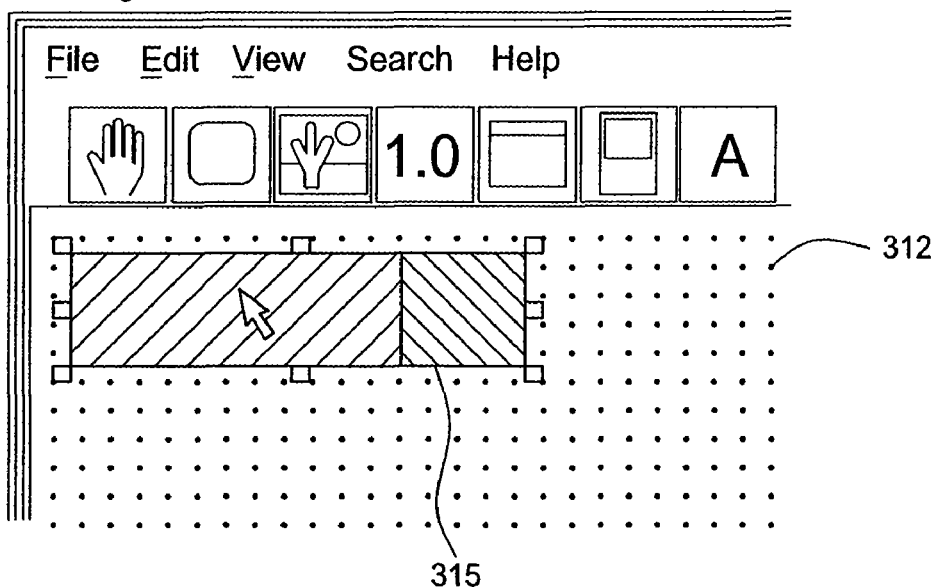
Table Widget
| Temperature | 75.30 | Degrees F |
| Wind Speed | 10.00 | Miles Per Hour |
| Rainfall Rate | 0.00 | Inches Per Hour |
| Dewpoint | 67.39 | Degrees F |
| Solar Level | 530.00 | Watts/Meter |
| Barometric pressure | 30.04 | Inches mercury |
| relative Humidity | 73.00 | Percent |
| Wind Direction | 128.00 | Degrees |
FIG. 3A

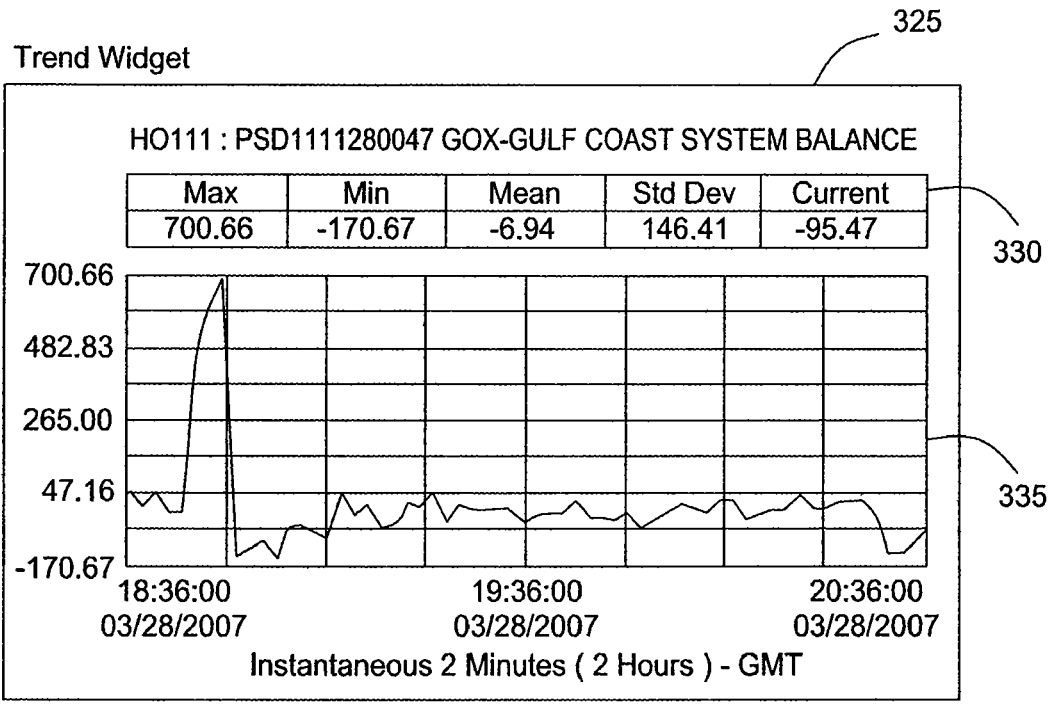
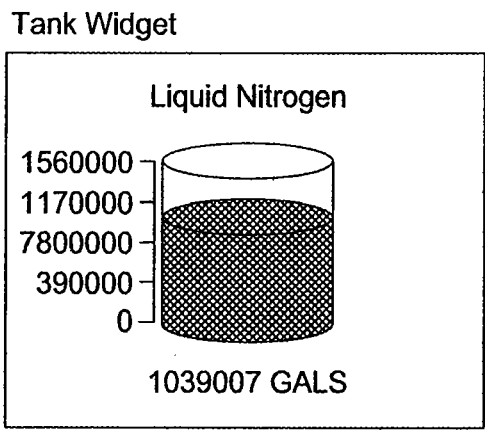
FIG. 3B

PRESENTING DYNAMIC SCADA DATA

BACKGROUND

Generally, a pipeline system provides a continuous pipe conduit that includes a variety of components and equipment, e.g., valves, compressor stations, communications systems, and meters. A pipeline may be used to transport liquid or gaseous materials from one point to another, usually from one point (or points) of production or processing to another, or to points of use. For example, an air separation unit may be used to separate atmospheric air into gaseous components (e.g., oxygen gas ($O_2$), nitrogen gas ($N_2$), hydrogen gas ($H_2$), Argon gas (Ar), etc.). At compressor stations, compressors maintain the pressure of the material in the pipeline as it is transported from one site to another. Similarly, for a liquid bearing pipeline, pumps may be used to introduce and maintain pressure for a liquid substance transported by the pipeline.

Running and maintaining a pipeline system can be expensive and complex, and the operations of a pipeline system are frequently coordinated and controlled from a central operations control center. At such a control center, an operator may monitor process data related to the operational state of the pipeline and each of its constituent elements using a SCADA (Supervisory Control and Data Acquisition) system. Other complex industrial systems and processes use a similar approach. For example, a petroleum refinery (at one end of a pipeline) may be monitored from a central control center using a real-time status database configured to receive data collected from the field devices of the refinery. Similarly, chemical production or processing facilities, steel mills, manufacturing plants, assembly lines, etc., are frequently monitored using on a centralized operations control center.

SUMMARY

Embodiments of the invention provide techniques for presenting users with dynamic views of process data related to the operations of an industrial system. One embodiment of the invention includes a method for providing a view of process data of a monitored industrial system. The method may generally include receiving, from an application program executing on a client computing system, a request to initiate a dynamic view of selected process data of the monitored industrial system, and in responsive to the request, transmitting a dynamic interface component to the requesting client computing system. The method may also include receiving, from the dynamic interface component, a request for one or more elements of process data obtained while monitoring the industrial system, retrieving a respective current value corresponding to each of the requested elements of process data, and transmitting the current values to the dynamic interface component. The dynamic interface component is configured to render a display of the current values on a design canvas. The method may also include sending notifications to the dynamic interface component of changes to the requested elements of process data obtained while monitoring the industrial system, wherein the notifications cause the dynamic interface component to update the current values on the design canvas.

Another embodiment of the invention includes a method. This method may generally include executing, on a processor, an application program configured to generate a dynamic view of process data obtained by a SCADA system configured to monitor an industrial system. The application may generally perform an operation. The operation itself may generally include transmitting, to the SCADA system, a request for one or more elements of process data obtained while monitoring the industrial system. The operation may further include receiving, in response to the request, a current value corresponding to each of the requested elements of process data, rendering a display of the current values on a design canvas, and registering to receive receiving notifications of changes to the requested elements of process data obtained while monitoring the industrial system. The operation may further include updating the rendered display on the design canvas with an updated current value, in response to receiving a notification.

Still another embodiment of the invention includes a computer-readable storage medium containing a dynamic data server application, which when executed on a processor performs an operation for providing a view of process data of a monitored industrial system. The operation itself may generally include receiving, from an application program executing on a client computing system, a request to initiate a dynamic view of selected process data of the monitored industrial system, and in response to the request, transmitting a dynamic interface component to the requesting client computing system. The operation may further include receiving, from the dynamic interface component, a request for one or more elements of process data obtained while monitoring the industrial system, retrieving a respective current value corresponding to each of the requested elements of process data, and transmitting the current values to the dynamic interface component. The dynamic interface component may be configured to render a display of the current values on a design canvas. The operation may also include sending notifications to the dynamic interface component of changes to the requested elements of process data obtained while monitoring the industrial system. The dynamic interface component updates the current values on the design canvas in response to the notifications.

Still another embodiment of the invention includes a system having a processor and a memory. The memory may store a dynamic data server application, which when executed on the processor performs an operation for providing a view of process data of a monitored industrial system. The operation itself may generally include receiving, from an application program executing on a client computing system, a request to initiate a dynamic view of selected process data of the monitored industrial system, and in response to the request, transmitting a dynamic interface component to the requesting client computing system. The operation may further include receiving, from the dynamic interface component, a request for one or more elements of process data obtained while monitoring the industrial system, retrieving a respective current value corresponding to each of the requested elements of process data, and transmitting the current values to the dynamic interface component. The dynamic interface component may be configured to render a display of the current values on a design canvas. The operation may also include sending notifications to the dynamic interface component of changes to the requested elements of process data obtained while monitoring the industrial system. The dynamic interface component updates the current values on the design canvas in response to the notifications.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIGS. 3A-3C illustrates examples of a variety of different graphical and trend widgets that may be painted onto the design canvas of FIG. 2 as part of composing a dynamic view of process data, according to one embodiment of the invention;

DESCRIPTION OF PREFERRED EMBODIMENTS

Figure 1:
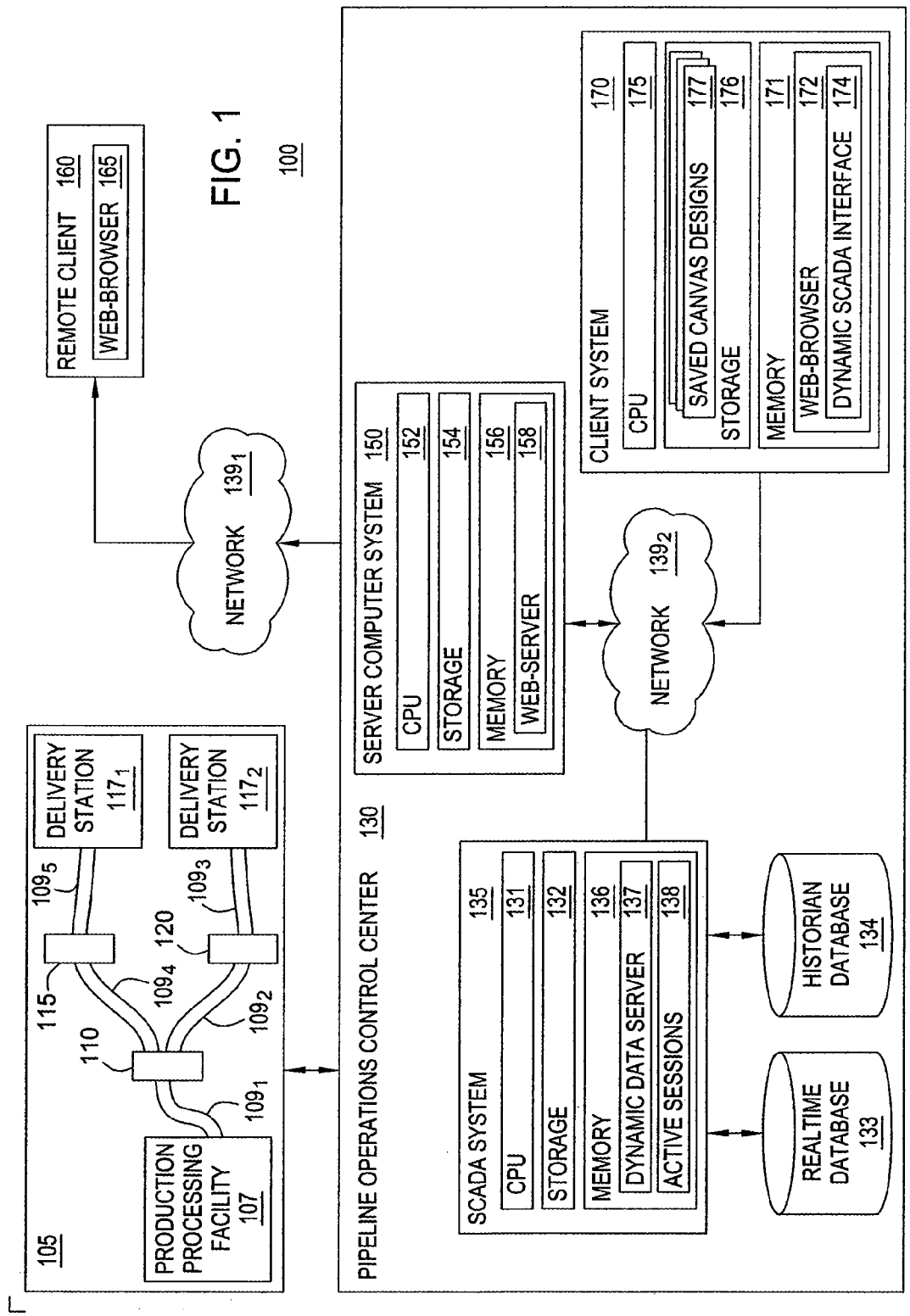
FIG. 1 is an illustration of a monitored pipeline and an operations control center, according to one embodiment of the invention.

Embodiments of the invention provide techniques for presenting users with dynamic views of process data related to the operations of an industrial system. Data obtained by a SCADA system may be stored in a real-time status database (which reflects the current process data of the industrial system) and a historian database (which archives the process data from the industrial system as it changes over time). A design canvas allows users to compose a dynamic view of the process data obtained by the SCADA system. For example, a user may compose a dynamic view of selected temperatures, pressures, and flow rates obtained by the SCADA system while monitoring the status of a pipeline.

In one embodiment, the design canvas is rendered for display using a web-browser. Further, the process data presented on the design canvas may be updated as data changes in the field (e.g., as the pressure at a monitored segment of the pipeline changes). For example, a canvas application running within the web-browser may register itself with a server component in order to receive notifications of changes to process data stored in the real-time status database managed by the SCADA system. This approach allows the view of the process data on the design canvas to always remain current, without requiring user action or page refreshing by the user.

The canvas application registers to receive update notifications for certain process data values monitored by the SCADA system, depending on what the user adds to the design canvas. In one embodiment, users compose a view of process data by painting elements (referred to as "widgets") onto the design canvas. Each widget may correspond to some element of process data monitored by the SCADA system. Thus, the design canvas allows users to "paint" a view of the industrial process they want to see.

Further, once painted, the canvas application maintains a connection to the server component of the SCADA system. Doing so allows process data rendered on the design canvas to be both dynamic and interactive. For example, a user can click on a widget and the canvas application manages communicating with the SCADA server to obtain process data needed for a variety of user-requested actions, e.g., to learn properties of an object on the canvas, to set alarm values, etc. Further still, the design canvas may allow the user to specify a variety of different rules, calculations, or logic to apply to the process data presented on the design canvas. For example, users may define thresholds or other conditions that result in visible changes to the canvas display (e.g., a change in widget color from green to red if the monitored temperature in a pipeline exceeds a threshold specified using the design canvas).

Similarly, the user may compose custom data objects from the process data. For example, a user could define a widget displaying an average temperature calculated using the actual pipeline temperature at multiple different locations. Of course, a variety of custom data objects may be composed according to the needs of a particular case.

In addition to presenting real-time process data values obtained from a SCADA system, the design canvas may allow users to compose data trends from both real-time process data and historical process data. A trend may show how a particular element of process data has changed over time. For example, a trend may be generated as changes occur in the current real-time value of process data (e.g., pipeline temperature) over a period of time. Alternatively, the design application may communicate with the server component of the SCADA system to obtain previous values from a historical database. In such a case, the trend could fully depend on historical data or a mix of both, e.g., the current value of an element of process data and a trend depicting how the value has changed over s specified previous amount of time (minutes, hours, etc.). The user may specify both a frequency at which data points are sampled to compose the trend and a period (e.g. a trend frequency of pipeline temperature every 15 minutes for a period of the previous two hours). The design canvas may also present a set of pre-defined trend period/frequencies for a given element of process data. Once defined, the trend is painted on the canvas and updated using data received from the SCADA component, as necessary.

Further still, once a user has composed a particular view of the industrial process on the design canvas, the user may save the composition as well as share the composition with other users. Thus, users can compose useful views of the industrial system accessed using any web browser, as well as save and share such views with other users.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified a FIG. 1 is an illustration of a monitored pipeline and an operations control center, according to one embodiment of the invention;

FIG. 1 is an illustration of a system 100 that includes a monitored pipeline 105 and an operations control center 130, according to one embodiment of the invention. As shown, monitored pipeline network 105 includes a production/processing facility 107 and delivery station $117_1$-$117_2$. Facility 107 may represent, for example, a molecular gas generation plant that includes one or more air separation units used to purify gaseous substances from the ambient atmosphere. The resulting product is delivered to stations $117_1$-$117_2$ over a pressurized gas pipeline. Illustratively, pipeline 105 includes pipeline segments $109_1$-$109_5$. Pipeline segments $109_1$, $109_2$, and $109_3$, provide a path from facility 107 to delivery station $117_2$ and pipeline segments $109_1$, $109_4$ and $109_5$ provide a path from facility 107 to delivery station $117_1$. Additionally, pipeline 105 includes compressor stations 110, 115, and 120 used to maintain the pressure of gaseous substances transported over pipeline 105.

Compressor stations 110, 115, and 120 may include sensor equipment used to monitor aspects of the operational state of the pipeline 105. For a pressurized gas pipeline, for example, a wide variety of field devices and parameters may be monitored including, for example, inlet gas pressure, outlet gas pressure, gas temperature, cooling liquid temperature, flow rates, and power consumption, among others. Similarly, the operational state of various field devices, air separation units, and equipment at production facility 107 and delivery stations $117_1$-$117_2$ may be monitored by sensor equipment. Of course, for other industrial networks and systems, the sensors and monitoring equipment may be selected to suit the needs of a particular case.

In one embodiment, the results of the monitoring equipment are transmitted to the pipeline operations control center 130. The pipeline operation control center 130 may employ a number of computer systems running application programs used to coordinate, monitor, and control the operations of pipeline 105. Illustratively, pipeline operations control center 130 includes a SCADA (Supervisory Control and Data Acquisition) system 135, a server system 150, a real-time database 133 and a historian database 134, and a client system 170, each communicating over a network $139_2$. Additionally, a remote client 160 communicates over network $139_1$ (e.g., the Internet) with the computer systems of the operations control center 130. For example, a user may interact with a web-browser 165 to access SCADA data over the web server 158. The computer systems 135, 133, 134, 150, 160 and 170 are included to be representative of existing computer systems, e.g., desktop computers, server computers, laptop computers, tablet computers and the like. However, embodiments of the invention are not limited to any particular computing system, application, device, architecture or network, and instead, may be adapted to take advantage of new computing systems and platforms as they become available. Additionally, one skilled in the art will recognize that the illustrations of computer systems 135, 133, 134, 150, 160 and 170 are simplified to highlight aspects of the present invention and that computing systems and networks typically include a variety of components not shown in FIG. 1.

As shown, SCADA system 135 includes a CPU 131, storage 132 and a memory 136. Similarly, server system 150 includes a CPU 152, storage 154, and a memory 156 and client system 170 includes a CPU 175, storage 176, and memory 171. CPUs 131, 152, and 175 are included to be representative of a single CPU, multiple CPUs, a single CPU having multiple processing cores, and the like. Memory 136, 156, and 171 may be a random access memory. While the memory 136, 156, and 171 is shown as a single entity, it should be understood that the memory 136, 156, and 171 may comprise a plurality of modules, and that the memory 136, 156, and 171 may exist at multiple levels, from high speed registers and caches to lower speed but larger DRAM chips. Storage 132, 154, and 176 may be hard disk drive storage devices. Storage 132, 154, and 176 may also be a combination of fixed and/or removable storage devices, such as fixed disc drives, floppy disc drives, tape drives, removable memory cards, or optical storage, etc.

As shown, the memory 136 of the SCADA system 135 includes a dynamic data server 137 and one or more active sessions 138. SCADA system 135 centralizes process data and allows remote monitoring and control of pipeline 105. Illustratively, the SCADA 135 system is configured to gather data in real-time from remote locations in order to control equipment and monitor conditions in pipeline 105. The monitored data may be stored in real-time database 133. The real-time database 133 is generally used to store the last known value for each element of element or component of an industrial system (e.g., pipeline 105) monitored using system 100. That is, the real-time database 133 may store data values each representing a monitored parameter of pipeline 105 and the current operational value of that parameter. The data may be written into real-time database 133 periodically, where values are updated at regular intervals, or exception based, where a new values are written into real-time database 133 only when the monitored value changes more than a predetermined value. SCADA system 135 may include both hardware and software components. The hardware gathers and feeds data into SCADA system 135, which processes this data and presents it to a user on client system 170. In one embodiment, a historian database 134 may be configured to retrieve (or receive) the values for monitored parameters from real-time database 133. Thus, the historian database 134 provides an archive of values from the real-time database 133.

In one embodiment, the dynamic data sever 137 manages a connection with a design canvas presented to a user of client system 170 (or remote client 160). For example, a user may interact with a web browser 172 on client system 170 to connect to a web server 158 executing on server system 150. In response, the web server 158 returns a page for the web browser 172 to render on a display screen. Additionally, the web server 158 may return a dynamic SCADA interface 174. In one embodiment, the dynamic SCADA interface 174 provides an executable component run by the web browser 172. For example, the dynamic SCADA interface 174 may be a JAVA® applet. Of course, other techniques may be used, e.g., asynchronous JAVASCRIPT® and XML (AJAX).

When executed by the browser 172, the dynamic SCADA interface 174 presents users a design canvas on which they may compose a view of process data captured by the SCADA system 135. The dynamic SCADA interface 174 may present a new "blank" canvas, but may also allow the user to load one of the stored canvas designs 177 in storage 176. In one embodiment, the dynamic SCADA interface 174 may be configured to establish a network connection with the dynamic data server 137, which creates an active session 138 for the dynamic SCADA interface 174. The user may then "paint" one or more dynamic data objects on a design canvas presented by the interface 174. The interface 174 may include a palette of objects representing the process data available from the SCADA system 135.

For example, the SCADA system may monitor a pipeline that includes storage tanks used to store excess product not yet introduced in to the pipeline. In such a case, the palette may present a "tank" object that the user could paint onto the design canvas. Once "painted" the design canvas displays the current level in the tank (retrieved by the dynamic data server 137 from the real-time database 133). In one embodiment, the dynamic SCADA interface 174, registers with the dynamic data server 137 to receive notifications of changes to the level in the storage tank. When received, the dynamic SCADA interface 174 then updates the display of the tank object on the design canvas.

Further, the dynamic SCADA interface 174 may be configured to allow the user to compose logic to apply to data objects painted on the design canvas as well as define trends to display on the canvas. Continuing with the example of a storage tank, the tank object may allow the user to set alarms based on the tank level. Thus, the user could specify a maximum or minimum level in the tank and some action to perform when the tank exceeds (or falls below) such a level. For example, the dynamic SCADA interface 174 could change the color of relevant screen attributes showing the current tank level from green to red. For example, the relevant screen attributes could be text, numerical values or the graphical attributes of the tank object itself. Additionally, audio could be used to play a sound file when the tank level crosses a specified threshold. Similarly, the user could create a trend display charting the level of the tank over a particular period of time. Further, the design canvas may allow the user to compose custom data objects from others (e.g., a tank widget showing an average level of two underlying storage tanks painted onto the design canvas). Additional examples of these data objects are described below.

Of course, the appearance, behavior, and capabilities of a data object painted on the design canvas may be tailored to correspond to the process data represented by a particular data object. Further, although real-time database 133, historian system 134, SCADA system 135, server system 150, and client system 170, are shown as separate components, one of ordinary skill in the art will recognize that these components may be applications running on a single computer system, or on multiple computer systems, and further, that these components may be configured in a variety of ways.

Figure 2:
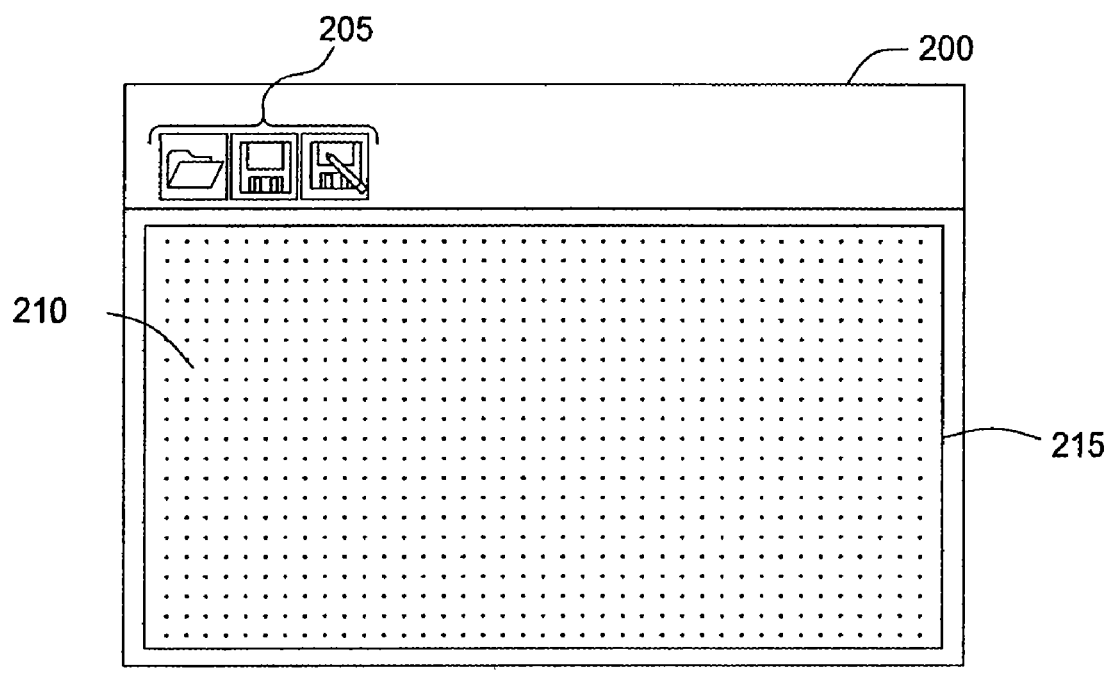
FIG. 2 is an example of a graphical user interface presenting a design canvas for composing dynamic views of process data, according to one embodiment of the invention.
Figure 3C:
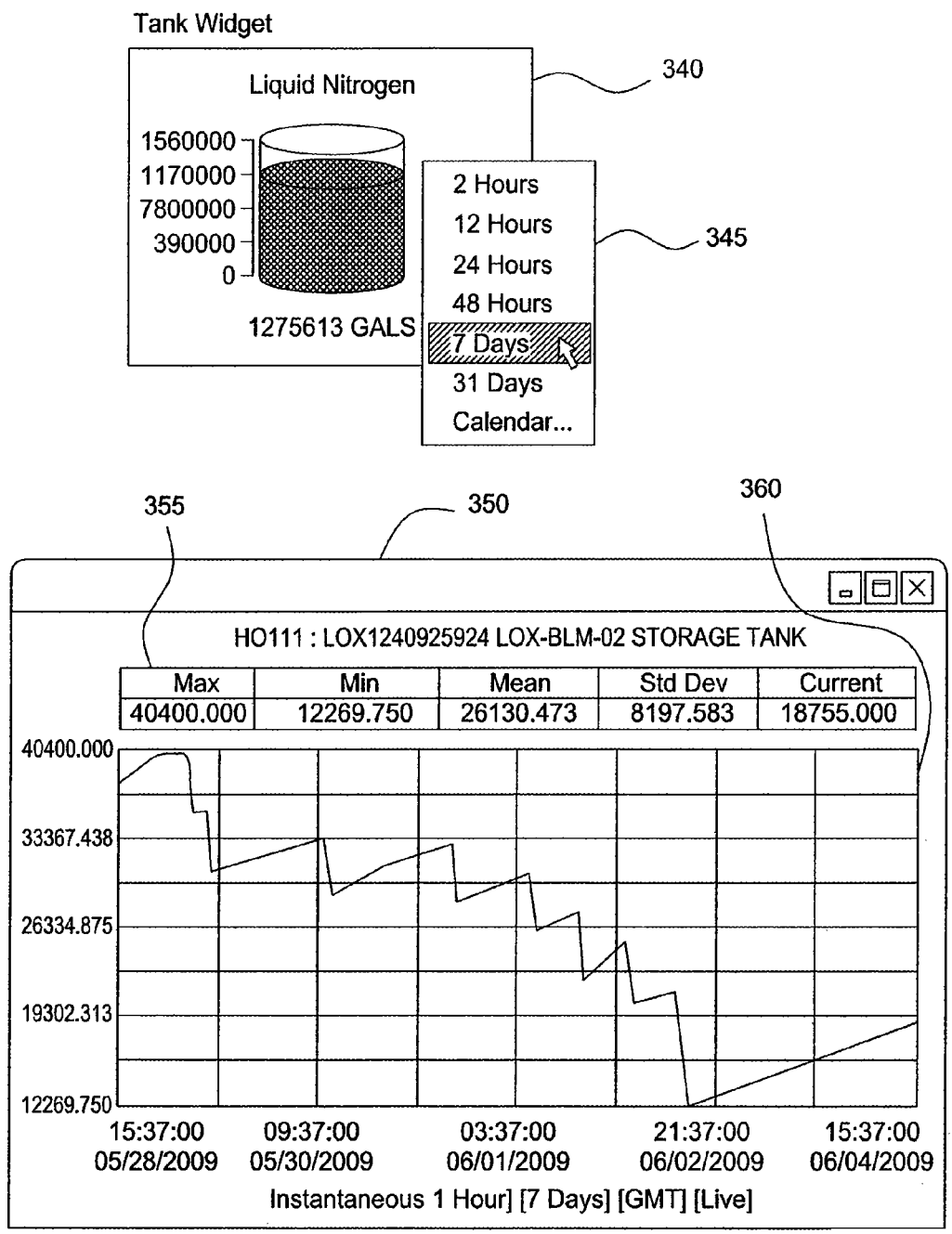

FIG. 2 is an example of a graphical user interface 200 presenting a design canvas 215 for composing dynamic views of process data obtained by a SCADA system, according to one embodiment of the invention. As shown, the view of interface 200 presents a blank design canvas 215, before a user has "painted" any dynamic data objects (referred to as "widgets") onto the design canvas 215. Illustratively, the interface 200 includes buttons 205 used to open an existing design canvas or save a current design canvas to storage. The palette 210 presents the particular collection of widgets which a user may select to "paint" onto the design canvas 215. FIGS. 3A-3C illustrates examples of a variety of different graphical and trend widgets that may be painted onto the design canvas of FIG. 2 as part of composing a dynamic view of process data, according to one embodiment of the invention.

First, FIG. 3A illustrates a dialog box 310 labeled "tag browser" and a data widget 305 overlaying a design canvas 300. In one embodiment, the buttons 205 include a button to launch dialog box 310. Once launched, the dialog box 310 allows the user to enter search parameters (e.g., text keywords) to identify a desired element of process data to display on the canvas. As an alternative to a keyword based search, a browsing approach may be used where a list (or a hierarchy) of elements of monitored process data is presented to the user. The dialog box 310 generally allows a user to search the process data stored by the SCADA system 135. In this particular example, the user has entered search terms to identify process data corresponding to a node of a pipeline labeled "H0111—Houston" with a metadata tag of "GOX balance." Note, "GOX Balance" generally refers to the mass balance of all Oxygen molecules entering and leaving a closed system such as a pipeline. In an ideal closed system the number of molecules entering the system will be equal to the number of molecules exiting the system, thus referred to as "balance."

Dialog box 310 also shows a partial list of results below the search terms. Each entry in the list represents process data in the SCADA system for the "H0111—Houston" node tagged with a metadata label of "GOX balance." In this example, assume the user has selected the second entry in the list and dragged this value to a desired location on the palette of the design canvas 300. In response, the dynamic SCADA interface paints the data widget 305 onto the deign canvas and displays the current value for the selected element of process data. Illustratively, the data widget 305 presents a numerical value of "271.53," which corresponds the current value of the element of SCADA process data selected from the list in dialog box 310. Further, when the SCADA system 135 receives an updated value for this element of process data (e.g., from sensors in the field), the dynamic data server may send a message to the design canvas 300 with an updated value to render on the canvas. Thus, the presentation of process data on the design canvas 300 reflects the most recent value stored by the SCADA system.

As shown, the data widget 305 includes controls 307 used to change the display size of this data widget. As noted above, once "painted" onto the design canvas 300, the dynamic data interface registers with the data server on the SCADA system to receive updates to the value represented by data widget 305 (in this example, the GOX balance at node "H0111" of a pipeline).

FIG. 3A also shows a design canvas 312 presenting an example of a bar widget 315. Rather than display a numerical value (like the one shown by data widget 305), the bar widget 315 shows graphical representation of numeric process data. For example, a bar widget may be used to display a temperature value recorded by a sensor on a pipeline system. As the temperature recorded by such a sensor changes (as reflected by the value in the real-time database 133), the bar widget 315 may receive a notification of a change in this value and update the display on the design canvas accordingly. Further, the colors shown by the bar widget 315 may change as the temperature exceeds (or falls below) thresholds set for the bar widget 315. Of course, the bar widget 315 may be used for process data other than temperatures. In such cases, the colors and thresholds where color changes occur may be tailored to the data represented by the bar widget 315 and the needs of a particular case.

FIG. 3A also shows an example of a table widget 320. In one embodiment, a table widget allows a user to collect multiple process data values and show them in a common table. The particular values in the table may be predefined for a table widget. For example, table widget 320 shows a number of weather related values for a particular point on a pipeline. However, in other cases, a user may customize a table widget by specifying what values should be displayed in that table widget. Like the data widget 305 and the bar widget 315, the data presented by the table widget corresponds to process data maintained by the SCADA system. Once "painted" on the design canvas, the dynamic SCADA interface 174 registers to receive notifications of updates to the process data presented by the table widget 320.

FIG. 3B shows an example of a trend widget 325. As noted above, users may "paint" trend data onto the design canvas. Generally, a trend allows a user to view both a current value for some element of process data monitored by the SCADA system, as well as a history showing how that value has changed over time. In this particular example, the trend widget 325 illustrates a GOX balance (gaseous oxygen) sampled every two minutes over a period of the past two hours. The results of the trend are shown in graph 335. Further, in this example, the trend widget 325 also shows a number of data values 330 calculated by the trend widget 325 for the trend period (i.e., for the current value and the past two hours, updated every two minutes). In this particular example, a maximum, a minimum, a mean, a standard deviation, and a current value for the process data used to generate the trend presented in graph 335. Of course, the values calculated by the trend widget 325 may be tailored to the needs of a particular case, as may the period and frequency with which the trend itself is generated.

FIG. 3B also shows a tank widget 340. As shown, the tank widget 340 displays the current level of a tank storing liquid nitrogen. Like the other widgets shown in FIGS. 3A-3C, the level in the tank displayed by widget 340 corresponds to the value stored by the SCADA system 135 in the real-time database 133. That is, when the tank widget 340 is "painted" onto a design canvas the dynamic SCADA interface 174 registers to receive notifications of updates to the process data presented by the tank widget 340; namely, the volume of liquid nitrogen in the tank. Further, like the other widgets, the user may specify certain graphical effects or other actions that should occur when the tank level reaches (or falls below) a particular level. For example, the color of the tank may change to red when the tank exceeds (or falls below) a critical level. Of course, other graphical effects may be displayed and other actions altogether could occur. For example, the tank widget may be configured to notify (e.g., via email or SMS messaging) a specified individual when the volume of liquid nitrogen in the tank reaches a specified amount.

Further, in one embodiment, the dynamic data interface 174 may allow the user to generate a trend display for widgets already "painted" on the design canvas. For example, FIG. 3C illustrates the tank widget 340 of FIG. 3B being used to generate a trend display 350. In this example, a user has right-clicked on the tank widget 340, resulting in a display of context menu 345, which allows a user to select a period for generating a trend. Further, trend display 350 shows the results of the user selecting a trend period of seven days. Specifically, trend display 350 includes a graph 360 showing the tank level as it has changed over the past seven days. In one embodiment, the dynamic data interface 174 receives the data used to generate the graph 360 in response to request sent to the data server component of the SCADA system (which in turn, queries the historian database 134 to retrieve the values needed to generate the trend for the selected trend period).

Once displayed, the trend may remain current. That is, as new values are stored in the real-time database for the volume of the liquid nitrogen represented by tank widget 340, the trend shown in graph 350 may be updated accordingly. Similarly, the data values 355 (calculated from the trend data) may be updated as well. Of course, the range of widgets provided by the dynamic SCADA interface may be tailored to suit the needs of an individual case. For example, rather than display a numerical value (or a representation of that value) a widget may display a status of an element in an industrial network (e.g., a status of "active" or "on" or the corresponding "inactive" or "off," etc.).

Figure 4:
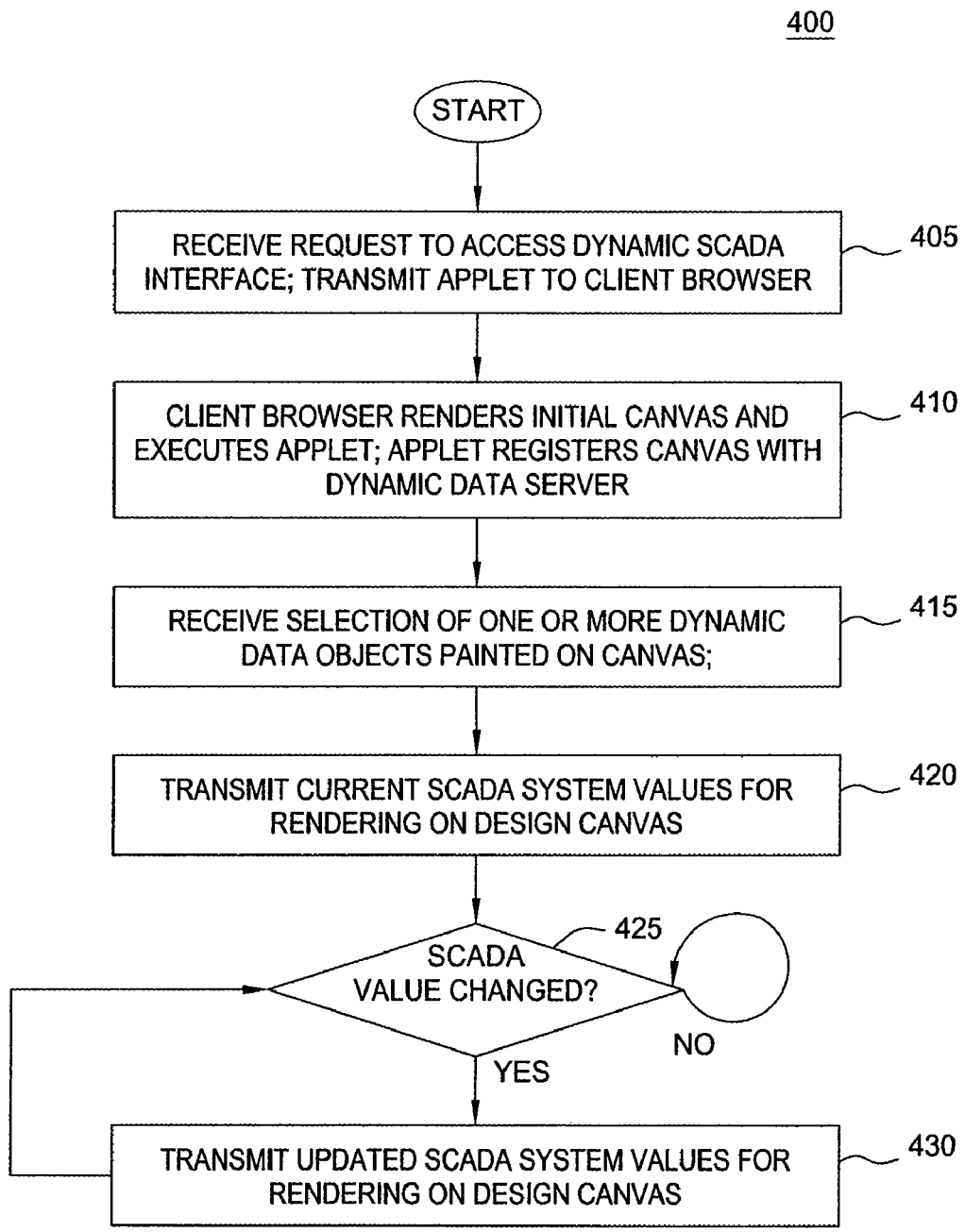
FIG. 4 illustrates a method for providing a dynamic view of process data related to the operations of an industrial system, according to one embodiment of the invention.

FIG. 4 illustrates a method 400 for providing a dynamic view of process data related to the operations of an industrial system, according to one embodiment of the invention. As shown, the method 400 begins at step 405 where a request for access to a dynamic SCADA interface is received. For example, a user may interact with web browser to access server system like server system 150 shown in FIG. 1. In response, the web server may transmit an instance of the dynamic SCADA interface to the requesting browser. For example, as noted above, the dynamic SCADA interface may be implemented as a JAVA® applet. In such a case, the JAVA® applet implementing the dynamic SCADA interface is transmitted to the client browser, which executes it within a JAVA® virtual machine (VM). Thus, at step 410, the client browser renders an initial design canvas and executes the dynamic SCADA interface. In one embodiment, the dynamic SCADA interface registers itself with the dynamic data server of the SCADA system. The data server may itself create an active session to track what process data has been "painted" on the design canvas presented by the dynamic SCADA interface. Doing so allows the data server to track what elements of process data have been requested by the dynamic SCADA interface, as well as what elements of process data should be pushed to dynamic SCADA interface, when changes to such process data are written to the real-time database.

Accordingly, at step 415, the dynamic data server receives a selection of a data object painted on the design canvas by the user. And at step 420, the dynamic data server retrieves values from the real-time database corresponding to the data object painted on the design canvas and transmits them to the dynamic SCADA interface. Once received, the interface renders a display of the data from the real-time database in a form appropriate for the data object (e.g., as a data widget displaying a numerical value, as a bar or tank widget displaying a graphical representation of numerical data, as a data trend, etc.).

At step 425, the dynamic data server monitors the values presented by a given user session. And at step 430, when such data values change (e.g., the SCADA system receives an update from a field sensor), the dynamic data server transmits updated values to the dynamic SCADA interface. Thus, data presented by widgets painted on the design canvas remain current, without the need for any user intervention.

Figure 5:
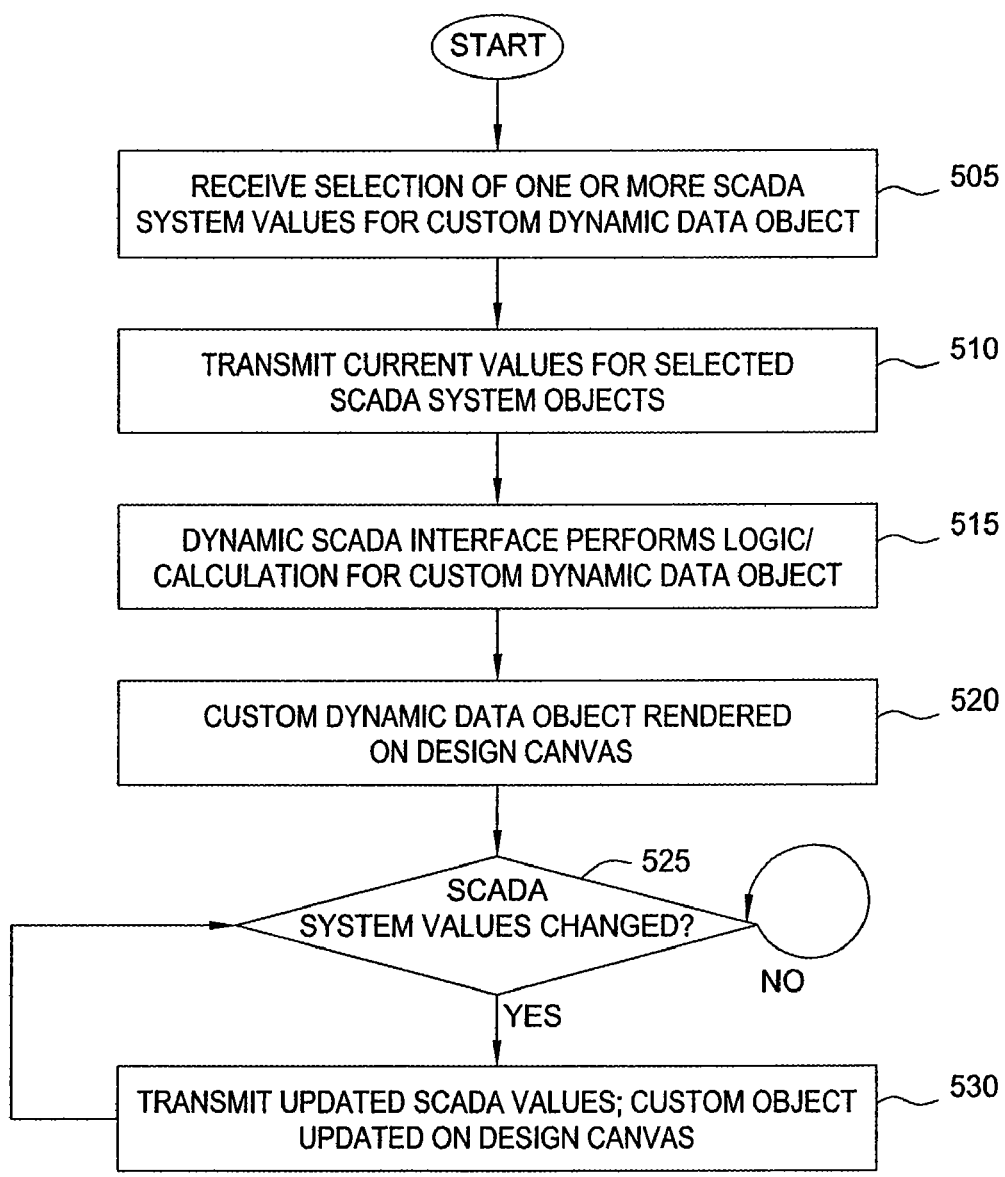
FIG. 5 illustrates a method for generating a custom dynamic data object using process data related to the operations of an industrial system, according to one embodiment of the invention.

In one embodiment, users may compose custom data objects using data values retrieved from the SCADA system (and real-time and historian databases. For example, a user may define a widget that displays an average (or other calculation) from a collection of data values retrieved from the SCADA system. FIG. 5 illustrates a method 500 for generating a custom dynamic data object using process data related to the operations of an industrial system, according to one embodiment of the invention. As shown, the method 500 begins at step 505, where the data server of the SCADA system receives a selection of one or more SCADA system values to be used by a custom dynamic data object. In response, at step 510, the dynamic data server transmits the requested current (or historical) values to the dynamic data interface. For example, the dynamic data server may issue queries to the real-time (and historian) databases as needed to respond to the request for data received at step 505.

At step 515, the dynamic SCADA interface performs logic/calculation to determine a value to present on the design canvas (e.g., an average tank level for multiple, underlying storage tanks used by a pipeline system). Thus, at step 520, the custom dynamic data object is rendered on the design canvas, presenting a user with a desired view of the values retrieved from the data server of the SCADA system.

At step 525, the dynamic data server monitors the values underlying a given dynamic data object presented on the design canvas. That is, the data server monitors the data values requested at step 505 and transmitted to the interface at step 510. Of course, only data values requested from the real-time database need be monitored by the SCADA system. And at step 530, when such data values change (e.g., the SCADA system receives an update from a field sensor), the dynamic data server transmits updated values to the dynamic SCADA interface. In response, the dynamic data interface may update the values presented on the design canvas when the values underlying custom data object change in the field (e.g., the volume of one of multiple tanks contributing to an average increases or decreases).

Figure 6:
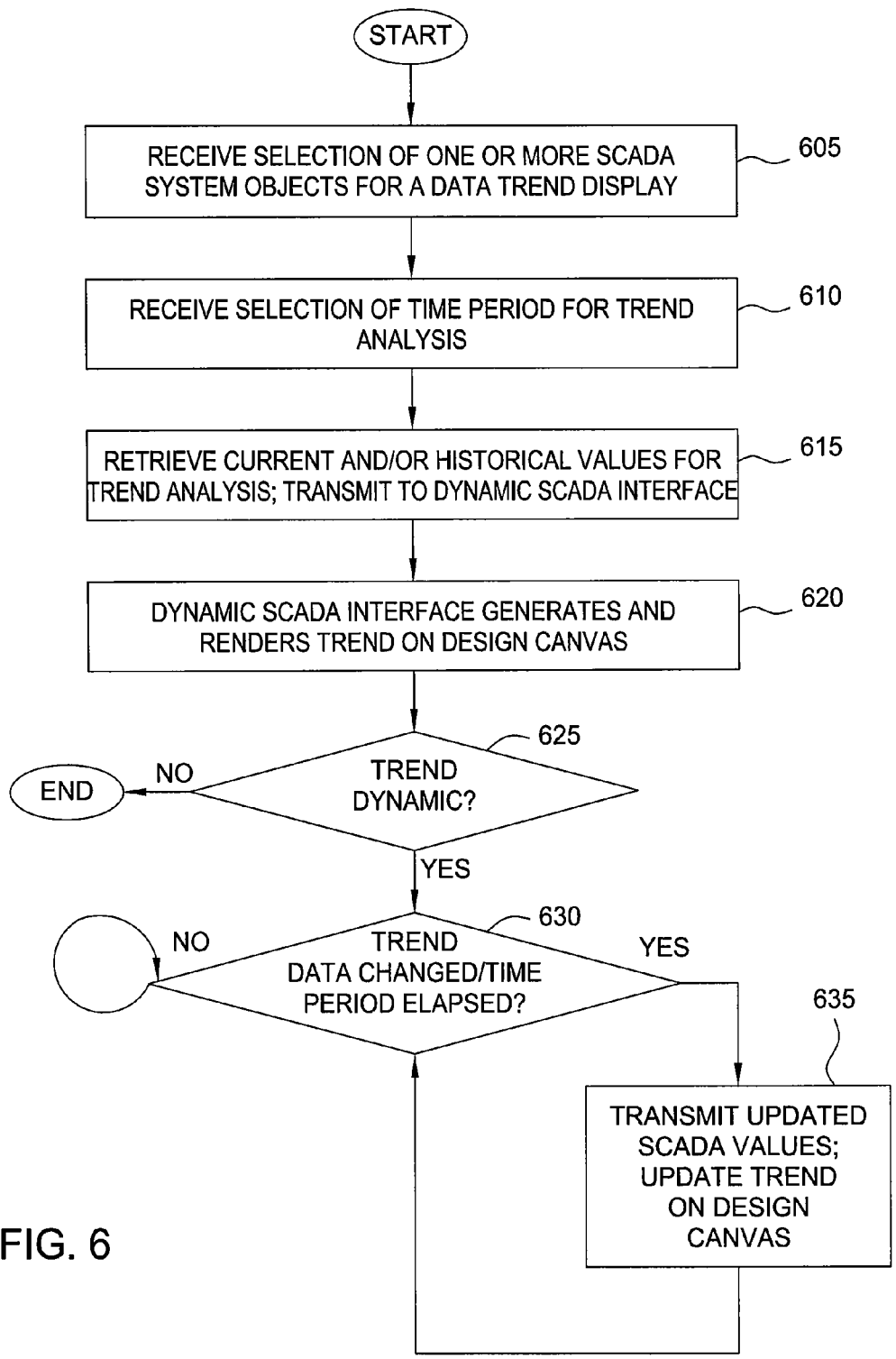
FIG. 6 illustrates a method for generating a custom trend data object using process data related to the operations of an industrial system, according to one embodiment of the invention.

FIG. 6 illustrates a method 600 for generating a custom trend data object using process data related to the operations of an industrial system, according to one embodiment of the invention. As shown, the method 600 begins at step 605, where the dynamic data server receives a selection of one or more SCADA system objects for a data trend display. And at step 610, the dynamic data server receives a selection of a time period for trend analysis. For example, FIG. 3B illustrates a GOX balance (gaseous oxygen) sampled every two minutes over a period of the past two hours. And FIG. 3C illustrates a data trend being generated to show how a volume of liquid nitrogen is changing, over the last seven days. At step 615, the dynamic data server retrieves the current and/or historical values needed to respond to the request for data received at step 605 for the time period received at step 610. For example, the dynamic data server may issue queries to the real-time (and historian) databases.

At step 620, the dynamic SCADA interface generates and renders a trend on the design canvas. At step 625, if the trend is not dynamic, then the method ends. That is, some trends may depend on values of the monitored industrial system that will not change, e.g., a trend that relies solely on data values archived by the historian database. Otherwise, at step 630, the dynamic data server monitors the values underlying the trend rendered on the design canvas at step 620. If such values in the real-time database have changed, then at step 635 the data server transmits updated values to the dynamic SCADA interface. In response, the dynamic data interface may update the trend presented on the design canvas. Additionally, in one embodiment, the dynamic SCADA interface may also monitor the time period associated with a trend and transmit values to the dynamic SCADA interface as appropriate. For example, if a trend is defined to present a period of two minutes, then every two minutes the dynamic data server may retrieve the current value from a real-time database and send it to the dynamic data interface (even if such value has not changed over the last two minutes). Alternatively, the dynamic data interface may simply request an updated value every two minutes. That is, the programmatic logic for updating a trend may be performed by the dynamic data server (as a server-side operation) or by the dynamic data interface (as a client-side operation).

Advantageously, embodiments of the invention provide techniques for presenting users with dynamic views of process data related to the operations of an industrial system. As described, data obtained by a SCADA system may be stored in a real-time status database (which reflects the current process data of the industrial system) and a historian database (which archives the process data from the industrial system as it changes over time). A design canvas allows users to compose a dynamic view of the process data obtained by the SCADA system. The canvas application registers to receive update notifications for certain process data values monitored by the SCADA system, depending on what the user adds to the design canvas. In one embodiment, users compose a view of process data by painting elements (referred to as "widgets") onto the design canvas. Each widget may correspond to some element of process data monitored by the SCADA system. Thus, the design canvas allows users to "paint" a view of the industrial process they want to see.

It will be understood, however, that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A computer-implemented method for providing a view of process data of a monitored industrial system, comprising:
   receiving, from an application program executing on a client computing system, a request to initiate a dynamic view of selected process data of the monitored industrial system;
   responsive to the request to initiate the dynamic view, transmitting a dynamic interface component to the requesting client computing system, wherein the dynamic interface component is executed by the application program to provide a design canvas used to compose the dynamic view of the selected process data of the monitored industrial system;
   receiving, from the dynamic interface component, a request for one or more elements of process data obtained while monitoring the industrial system;
   retrieving a respective current value corresponding to each of the requested elements of process data;

transmitting the current values to the dynamic interface component, wherein the dynamic interface component is configured to render a display of the current values on the design canvas; and sending notifications to the dynamic interface component of changes to the requested elements of process data obtained while monitoring the industrial system, wherein the notifications cause the dynamic interface component to update the current values on the design canvas.

2. The computer-implemented method of claim 1, wherein the request for one or more elements of process data comprises a request for a plurality of values for a first element of process data, including the current value, each obtained and a different point in time, and wherein the dynamic interface component is further configured to generate a trend displaying changes to the first element of element of process data, over time.

3. The computer-implemented method of claim 1, wherein the dynamic interface component is configured to render the display of one or more of the current values by calculating a display value from the one or more current values.

4. The computer-implemented method of claim 1, wherein rendering the display of at least one of the current values comprises rendering a numerical value on the design canvas.

5. The computer-implemented method of claim 1, wherein rendering the display of at least one of the current values comprises rendering a graphical display widget, wherein the appearance of the widget is derived from the at least one current value.

6. The computer-implemented method of claim 1, wherein the dynamic interface component is configured to render the design canvas as web page on a web browser.

7. The computer implemented method of claim 1, wherein the monitored industrial system is a pipeline.

8. The computer-implemented method of claim 1, further comprising:

identifying a change to the current value corresponding to one of the requested elements of process data; and transmitting an updated current value to the dynamic interface component, wherein the dynamic interface component is configured to update the rendered display on the design canvas with the updated current value.

9. The computer-implemented method of claim 8, wherein the dynamic interface component is further configured to:

evaluate the updated current value against one or more alert conditions, and in response to the evaluation, modify the display of the current value on the design canvas when the alert conditions are satisfied to indicate that the alert conditions are satisfied by the updated current value.

10. A computer-implemented method, comprising:

executing, on a processor, an application program configured to generate a dynamic view of selected process data obtained by a SCADA system configured to monitor an industrial system, wherein the application is configured to perform an operation, comprising:

receiving a dynamic interface component wherein the dynamic interface component is executed by the application program to provide a design canvas used to compose the dynamic view of the selected process data of the monitored industrial system, composing, on the design canvas, a dynamic view of one or more elements of the selected process data of the monitored industrial system obtained by the SCADA system, transmitting, to the SCADA system, a request for the one or more elements of process data obtained while monitoring the industrial system;

receiving, in response to the request, a current value corresponding to each of the requested elements of process data, rendering a display of the current values on the design canvas according to the composed dynamic view, registering to receive receiving notifications of changes to the requested elements of process data obtained while monitoring the industrial system, and in response to receiving a notification, updating the rendered display on the design canvas with an updated current value.

11. The computer-implemented method of claim 10, wherein the operation further comprises:

evaluating the updated current value against one or more alert conditions, and in response to the evaluation, modifying the display of the current value on the design canvas when the alert conditions are satisfied to indicate that the alert conditions are satisfied by the updated current value.

12. A computer-readable storage medium containing a dynamic data server application, which when executed on a processor is configured to perform an operation for providing a view of process data of a monitored industrial system, the operation comprising:

receiving, from an application program executing on a client computing system, a request to initiate a dynamic view of selected process data of the monitored industrial system;

responsive to the request to initiate the dynamic view, transmitting a dynamic interface component to the requesting client computing system, wherein the dynamic interface component is executed by the application program to provide a design canvas used to compose the dynamic view of the selected process data of the monitored industrial system;

receiving, from the dynamic interface component, a request for one or more elements of process data obtained while monitoring the industrial system; retrieving a respective current value corresponding to each of the requested elements of process data;

transmitting the current values to the dynamic interface component, wherein the dynamic interface component is configured to render a display of the current values on the design canvas; and sending notifications to the dynamic interface component of changes to the requested elements of process data obtained while monitoring the industrial system, wherein the notifications cause the dynamic interface component to update the current values on the design canvas.

13. The computer-readable storage medium of claim 12, wherein the request for one or more elements of process data comprises a request for a plurality of values for a first element of process data, including the current value, each obtained and a different point in time, and wherein the dynamic interface component is further configured to generate a trend displaying changes to the first element of element of process data, over time.

14. The computer-readable storage medium of claim 12, wherein the dynamic interface component is configured to render the display of one or more of the current values by calculating a display value from the one or more current values.

15. The computer-readable storage medium of claim 12, wherein rendering the display of at least one of the current values comprises rendering a numerical value on the design canvas.

16. The computer-readable storage medium of claim 12, wherein rendering the display of at least one of the current values comprises rendering a graphical display widget, wherein the appearance of the widget is derived from the at least one current value.

17. The computer-readable storage medium of claim 12, wherein the dynamic interface component is configured to render the design canvas as web page on a web browser.

18. The computer-readable storage medium of claim 12, wherein the monitored industrial system is a pipeline.

19. The computer-readable storage medium of claim 12, wherein the operation further comprises:
  identifying a change to the current value corresponding to one of the requested elements of process data; and
  transmitting an updated current value to the dynamic interface component, wherein the dynamic interface component is configured to update the rendered display on the design canvas with the updated current value.

20. The computer-readable storage medium of claim 19, wherein the dynamic interface component is further configured to:
  evaluate the updated current value against one or more alert conditions; and
  in response to the evaluation, modify the display of the current value on the design canvas when the alert conditions are satisfied to indicate that the alert conditions are satisfied by the updated current value.

21. A system, comprising:
  a processor; and
  a memory storing a dynamic data server application, which when executed on a processor is configured to perform an operation for providing a view of process data of a monitored industrial system, the operation comprising:
    receiving, from an application program executing on a client computing system, a request to initiate a dynamic view of selected process data of the monitored industrial system,
    responsive to the request to initiate the dynamic view, transmitting a dynamic interface component to the requesting client computing system, wherein the dynamic interface component is executed by the application program to provide a design canvas used to compose the dynamic view of the selected process data of the monitored industrial system,
    receiving, from the dynamic interface component, a request for one or more elements of process data obtained while monitoring the industrial system,
    retrieving a respective current value corresponding to each of the requested elements of process data,
    transmitting the current values to the dynamic interface component, wherein the dynamic interface component is configured to render a display of the current values on the design canvas, and
    sending notifications to the dynamic interface component of changes to the requested elements of process data obtained while monitoring the industrial system, wherein the notifications cause the dynamic interface component to update the current values on the design canvas.

22. The system of claim 21, wherein the operation further comprises:
  identifying a change to the current value corresponding to one of the requested elements of process data; and
  transmitting an updated current value to the dynamic interface component, wherein the dynamic interface component is configured to update the rendered display on the design canvas with the updated current value.

23. The system of claim 22, wherein the dynamic interface component is further configured to:
  evaluate the updated current value against one or more alert conditions, and
  in response to the evaluation, modify the display of the current value on the design canvas when the alert conditions are satisfied to indicate that the alert conditions are satisfied by the updated current value.

24. The system of claim 22, wherein the request for one or more elements of process data comprises a request for a plurality of values for a first element of process data, including the current value, each obtained and a different point in time, and wherein the dynamic interface component is further configured to generate a trend displaying changes to the first element of element of process data, over time.

25. The system of claim 22, wherein the dynamic interface component is configured to render the display of one or more of the current values by calculating a display value from the one or more current values.

* * * * *